(12) United States Patent
Tamboli et al.

(10) Patent No.: US 10,234,065 B2
(45) Date of Patent: *Mar. 19, 2019

(54) COLLET SECURING DEVICE FOR JOINING TWO FLUID LINES AND PROVIDING LATERAL SUPPORT AT THE CONNECTION OF THE TWO FLUID LINES

(71) Applicant: WHIRLPOOL CORPORATION, Benton Harbor, MI (US)

(72) Inventors: Manjur Tamboli, St. Joseph, MI (US); Melissa Marie Bippus, Evansville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,922

(22) Filed: Apr. 17, 2017

(65) Prior Publication Data

US 2017/0219146 A1    Aug. 3, 2017

Related U.S. Application Data

(63) Continuation of application No. 14/923,817, filed on Oct. 27, 2015, now Pat. No. 9,671,052.

(51) Int. Cl.
  *F16L 37/10*   (2006.01)
  *F16L 37/138*  (2006.01)
  (Continued)

(52) U.S. Cl.
  CPC .............. *F16L 37/101* (2013.01); *F16L 25/06* (2013.01); *F16L 37/121* (2013.01);
  (Continued)

(58) Field of Classification Search
  CPC ....... F16L 37/138; F16L 25/06; F16L 37/101; F16L 55/07; F16L 23/10; F16L 25/009; F16L 25/10; F16L 25/12; F16L 33/12
  (Continued)

(56) References Cited

U.S. PATENT DOCUMENTS 2,784,987 A * 3/1957 Corcoran .............. F16B 7/0413
                                                    285/315
3,359,907 A   12/1967 Bochan
(Continued)

FOREIGN PATENT DOCUMENTS

CN    202630562    12/2012
DE    2005011732   7/2006
(Continued)

*Primary Examiner* — Reinaldo Sanchez-Medina
*Assistant Examiner* — David Colon Morales
(74) *Attorney, Agent, or Firm* — Price Heneveld LLP

(57) ABSTRACT

A fluid line support system includes a fluid line and a collet having an insertion end and a thickened portion having a biased end. A fluid valve has a valve aperture that receives the insertion end of the collet. A collet securing device has a fluid line portion that engages the wall of the fluid line, wherein at least the fluid line portion encircles the wall and is slidably engaged with the wall to define a loose position and a securing position. A collet portion of the collet securing device engages the retaining portion of the fluid valve when in the securing position. When in the securing position, the fluid line portion engages the biased end of the collet, wherein the fluid line and collet portions bias the retaining portion and biased end toward one another such that the insertion end is positioned at a final insertion depth.

18 Claims, 5 Drawing Sheets

(51) Int. Cl.
*F16L 25/06* (2006.01)
*F16L 55/07* (2006.01)
*F16L 15/08* (2006.01)
*F16L 25/00* (2006.01)
*F16L 37/12* (2006.01)

(52) U.S. Cl.
CPC ............ *F16L 37/138* (2013.01); *F16L 55/07* (2013.01); *F16L 15/08* (2013.01); *F16L 25/009* (2013.01); *F16L 37/1205* (2013.01)

(58) Field of Classification Search
USPC .................................. 285/87–88, 320, 81
See application file for complete search history.

(56) References Cited

U.S. PATENT DOCUMENTS

| | | | |
|---|---|---|---|
| 3,455,119 A | 7/1969 | Bright | |
| 3,680,893 A | 8/1972 | Giraud | |
| 3,751,179 A | 8/1973 | Wassmann | |
| 3,773,432 A | 11/1973 | Chow et al. | |
| 3,807,776 A * | 4/1974 | Bingham | F16L 47/24 285/149.1 |
| 3,836,001 A | 9/1974 | Heldreth | |
| 4,068,870 A | 1/1978 | Whitney et al. | |
| 4,251,758 A | 2/1981 | Pedersen et al. | |
| 4,334,559 A * | 6/1982 | Deem | C21C 5/462 141/311 R |
| 4,409,532 A | 10/1983 | Hollenbeck et al. | |
| 4,451,069 A | 5/1984 | Melone | |
| 4,600,361 A | 7/1986 | Bianco | |
| 4,647,082 A | 3/1987 | Fournier et al. | |
| 4,671,540 A | 6/1987 | Medvick et al. | |
| 4,804,213 A | 2/1989 | Guest | |
| 4,895,570 A * | 1/1990 | Larkin | A61M 39/1011 604/411 |
| 5,142,214 A | 8/1992 | Purson et al. | |
| 5,214,936 A | 6/1993 | Lim et al. | |
| 5,395,140 A | 3/1995 | Wiethorn | |
| 5,628,531 A | 5/1997 | Rosenberg et al. | |
| 5,658,020 A | 8/1997 | Carman et al. | |
| 5,740,835 A | 4/1998 | Murphy | |
| 5,823,266 A * | 10/1998 | Burleson | E21B 17/06 166/380 |
| 5,911,750 A | 6/1999 | Mandel et al. | |
| 5,921,104 A | 7/1999 | Chang | |
| 6,070,419 A | 6/2000 | Chang | |
| 6,114,827 A | 9/2000 | Alvaro | |
| 6,159,962 A | 12/2000 | Steiner et al. | |
| 6,257,278 B1 * | 7/2001 | Danielson | F16L 37/1215 137/614.03 |
| 6,519,962 B1 | 2/2003 | Schuetter | |
| 6,574,979 B2 | 6/2003 | Faqih | |
| 6,672,628 B2 | 1/2004 | Thomas et al. | |
| 6,854,772 B2 | 2/2005 | Weller et al. | |
| 6,863,314 B2 | 3/2005 | Guest | |
| 6,880,865 B2 * | 4/2005 | Guest | F16L 37/0925 285/322 |
| 6,913,294 B2 | 7/2005 | Treverton et al. | |
| 7,316,428 B2 | 1/2008 | Takayanagi et al. | |
| 7,425,022 B2 * | 9/2008 | Guest | F16L 19/086 285/322 |
| 7,458,171 B1 | 12/2008 | Lentz | |
| 7,510,216 B2 | 3/2009 | Tomerlin et al. | |
| 7,624,896 B2 | 12/2009 | Doglioni Majer | |
| 7,793,914 B2 * | 9/2010 | Danielson | F16L 37/0848 251/149.6 |
| 7,866,182 B2 | 1/2011 | Lim et al. | |
| 8,029,024 B2 | 10/2011 | Guest | |
| 8,083,104 B2 | 12/2011 | Roetker et al. | |
| 8,087,436 B2 * | 1/2012 | Danielson | F16L 37/138 141/392 |
| 8,266,814 B2 | 9/2012 | Grunert | |
| 8,419,076 B2 * | 4/2013 | Keller | F16L 37/1225 285/23 |
| 8,499,978 B2 | 8/2013 | Dalchau et al. | |
| 8,540,118 B2 | 9/2013 | McDonald et al. | |
| 8,695,371 B2 | 4/2014 | Boarman et al. | |
| 8,789,854 B2 | 7/2014 | Christian, Jr. et al. | |
| 8,844,979 B2 * | 9/2014 | Danielson | F16L 37/1215 137/798 |
| 8,882,156 B2 * | 11/2014 | Guest | F16L 37/101 285/322 |
| 8,926,275 B2 | 1/2015 | Badafem et al. | |
| 9,065,363 B2 | 6/2015 | Marioni | |
| 9,088,236 B2 | 7/2015 | Marioni | |
| 9,255,358 B2 | 2/2016 | Kim | |
| 9,273,903 B2 | 3/2016 | Vian et al. | |
| 9,309,103 B2 | 4/2016 | Ergican et al. | |
| 9,333,950 B2 * | 5/2016 | Opel | B60S 1/481 |
| 9,373,210 B2 | 6/2016 | Wittern, Jr. et al. | |
| 9,506,682 B2 | 11/2016 | Yun et al. | |
| 9,581,377 B2 | 2/2017 | Kim et al. | |
| 9,617,680 B2 | 4/2017 | Kitayama et al. | |
| 9,671,052 B2 * | 6/2017 | Bippus | F16L 37/138 |
| 9,702,080 B2 | 7/2017 | Lee et al. | |
| 9,909,701 B2 * | 3/2018 | Guest | F16L 37/0925 |
| 2003/0011195 A1 * | 1/2003 | Hayes, Jr. | F16L 19/0231 285/387 |
| 2004/0074541 A1 * | 4/2004 | Sharpe | H05K 7/20272 137/614.04 |
| 2006/0277690 A1 | 12/2006 | Pyo et al. | |
| 2008/0012314 A1 * | 1/2008 | Harger | F16L 37/0982 285/308 |
| 2010/0253075 A1 | 10/2010 | Werth | |
| 2012/0032629 A1 | 2/2012 | Peterson et al. | |
| 2012/0104021 A1 | 5/2012 | Cur et al. | |
| 2012/0114473 A1 | 5/2012 | Badafem et al. | |
| 2012/0228871 A1 | 9/2012 | Li | |
| 2013/0257043 A1 | 10/2013 | Guest | |
| 2014/0013616 A1 | 1/2014 | Lee et al. | |
| 2014/0131999 A1 * | 5/2014 | Sannadi | F16L 37/107 285/321 |
| 2014/0319823 A1 * | 10/2014 | Happich | F16L 37/10 285/309 |
| 2015/0069755 A1 * | 3/2015 | Bull | E21B 33/038 285/406 |
| 2015/0225226 A1 | 8/2015 | You et al. | |
| 2015/0345072 A1 | 12/2015 | Ko et al. | |
| 2016/0083238 A1 | 3/2016 | Koo | |
| 2016/0083894 A1 | 3/2016 | Bison et al. | |
| 2016/0115643 A1 | 4/2016 | Bison et al. | |
| 2016/0138849 A1 | 5/2016 | Lee et al. | |
| 2016/0201985 A1 | 7/2016 | Lee et al. | |
| 2016/0205988 A1 | 7/2016 | Bird et al. | |
| 2016/0341462 A1 | 11/2016 | Kim | |
| 2017/0051449 A1 | 2/2017 | Nam et al. | |
| 2017/0059224 A1 | 3/2017 | Bae et al. | |

FOREIGN PATENT DOCUMENTS

| | | |
|---|---|---|
| EP | 0682404 | 11/1995 |
| EP | 945973 | 9/1999 |
| EP | 2508668 A1 | 10/2012 |
| EP | 2620541 | 7/2013 |
| GB | 2288457 A | 10/1995 |
| JP | 2006177330 | 7/2006 |
| JP | 2009287527 | 12/2009 |
| WO | 2004045351 | 6/2004 |
| WO | 2012072477 | 6/2012 |
| WO | 2012146534 A2 | 11/2012 |
| WO | 2014115976 | 7/2014 |

* cited by examiner

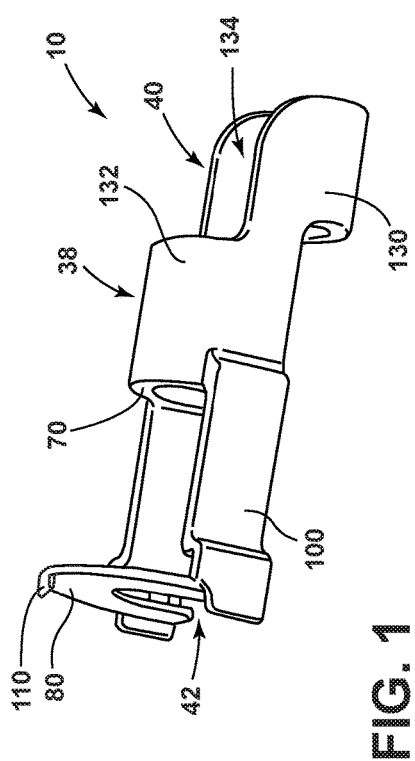
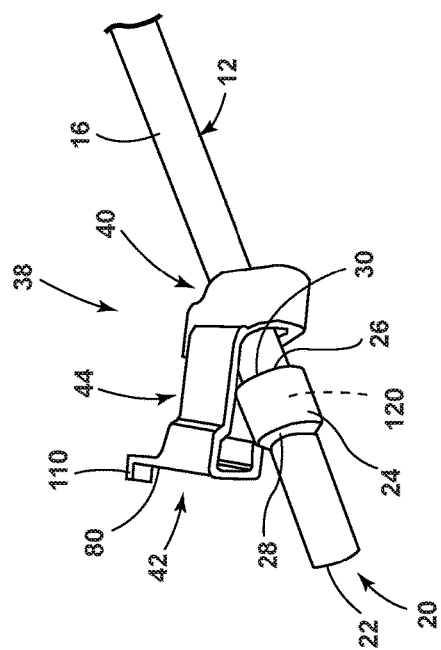
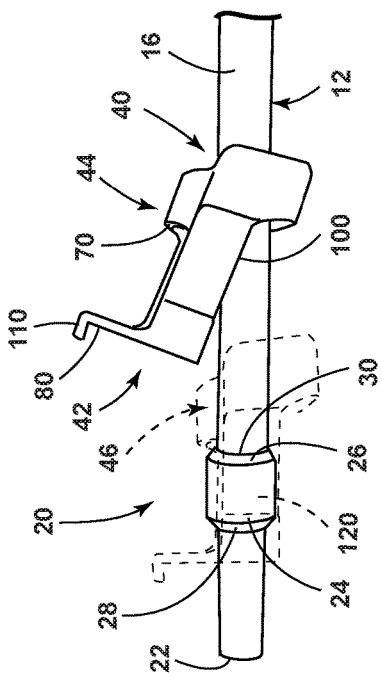

COLLET SECURING DEVICE FOR JOINING TWO FLUID LINES AND PROVIDING LATERAL SUPPORT AT THE CONNECTION OF THE TWO FLUID LINES

CROSS-REFERENCE TO RELATED APPLICATION

The present application is a continuation of U.S. patent application Ser. No. 14/923,817 filed Oct. 27, 2015, entitled COLLET SECURING DEVICE FOR JOINING TWO FLUID LINES AND PROVIDING LATERAL SUPPORT AT THE CONNECTION OF THE TWO FLUID LINES, the entire disclosure of which is hereby incorporated herein by reference.

BACKGROUND

The device is in the field of water systems for appliances, and more specifically, a collet securing device for joining two fluid lines and providing lateral support thereto.

SUMMARY

In one aspect of the present device, a fluid line support system includes a fluid line having a wall and a line end. A collet is included having an insertion end and a thickened portion, the thickened portion having a biased end and a securing section. The securing section is disposed between the biased end and the insertion end, and wherein the line end of the fluid line extends through a fluid line aperture in the biased end. A fluid valve is coupled with a valve line and has a valve aperture that receives the insertion end of the collet. The engagement of the fluid valve with the collet places the valve line in communication with the fluid line. The fluid valve includes a retaining portion. Also included is a collet securing device having a fluid line portion and a collet portion. The fluid line portion engages the wall of the fluid line, wherein at least the fluid line portion encircles the wall and is slidably engaged with the wall to define a loose position and a securing position. The collet portion engages the retaining portion of the fluid valve when the collet securing device is in the securing position. The securing position is further defined by the fluid line portion engaging the biased end of the collet, wherein the fluid line and collet portions bias the retaining portion and biased end toward one another such that the insertion end is positioned at a final insertion depth to place the valve line in communication with the fluid line.

In at least another aspect, a fluid line support includes a collet having an insertion end and a thickened portion, the thickened portion defining at least one securing section. The thickened portion also defines an internal volume that is in communication with the insertion end. A fluid valve includes a valve aperture wherein the insertion end is inserted into the valve aperture to define a final insertion depth. The fluid valve has a retaining portion. A collet securing device has a collet portion that engages the retaining portion and the thickened portion to define a securing position. The collet securing device includes first and second line engagement portions that cooperate with the interior volume of the collet to define a line receptacle for positioning a fluid line, and wherein the first and second line engagement portions are positioned opposite one another and each of the first and second line engagement portions cooperate to encircle the line receptacle.

In at least another aspect, a method for attaching a fluid-line support system to a fluid line of an appliance includes steps of threading the line end of the fluid line through an opening of the collet securing device and disposing the collet onto the line end of the fluid line. The thickened portion of the collet has a cross-sectional thickness and the opening includes an opening width wherein the opening width is less than the cross-sectional thickness. The method also includes steps of inserting the insertion end of the collet into the valve aperture such that the insertion end is at least near the final insertion depth and disposing the collet securing device in the securing position, wherein the fluid line portion engages and encircles a portion of the fluid line and the collet portion engages the retaining portion of the fluid valve to secure the insertion end at the final insertion depth within the fluid valve. The engagement of the collet securing device in the securing position limits the deflection of the fluid line proximate the collet and the fluid valve.

These and other features, advantages, and objects of the present device will be further understood and appreciated by those skilled in the art by reference to the following specification, claims, and appended drawings.

BRIEF DESCRIPTION OF THE DRAWINGS

The foregoing summary, as well as the following detailed description of the device, will be better understood when read in conjunction with the appended drawings. For the purpose of illustrating the device, there are shown in the drawings, certain embodiment(s) which are presently preferred. It should be understood, however, that the device is not limited to the precise arrangements and instrumentalities shown. Drawings are not necessary to scale. Certain features of the device may be exaggerated in scale or shown in schematic form in the interest of clarity and conciseness.

FIG. 1 is a top perspective view of an embodiment of a collet securing device;

FIG. 2 is a side perspective view of an alternate aspect of the collet securing device placed on a fluid line having a collet disposed thereon;

FIG. 3 is a side perspective view of the fluid line of FIG. 2 showing the collet securing device about to be placed over a thickened portion of the collet;

DETAILED DESCRIPTION

Before the subject device is described further, it is to be understood that the device is not limited to the particular embodiments of the device described below, as variations of the particular embodiments may be made and still fall within the scope of the appended claims. It is also to be understood that the terminology employed is for the purpose of describing particular embodiments, and is not intended to be limiting. Instead, the scope of the present device will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the device. The upper and lower limits of these smaller ranges may independently be included in the smaller ranges, and are also encompassed within the device, subject to any specifically excluded limit in the stated range. Where the stated range includes one or both of the limits, ranges excluding either or both of those included limits are also included in the device.

In this specification and the appended claims, the singular forms "a," "an" and "the" include plural reference unless the context clearly dictates otherwise.

Figure 4:
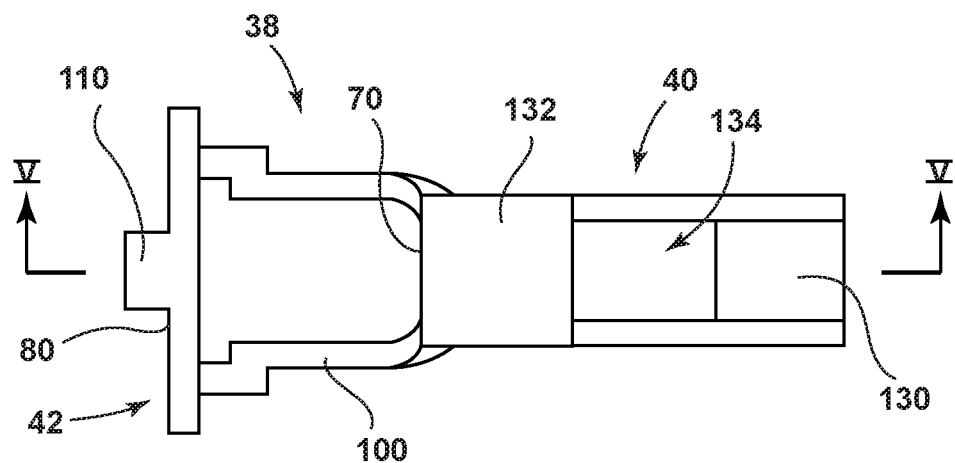
FIG. 4 is a top plan view of the collet securing device of FIG. 1.
Figure 5:
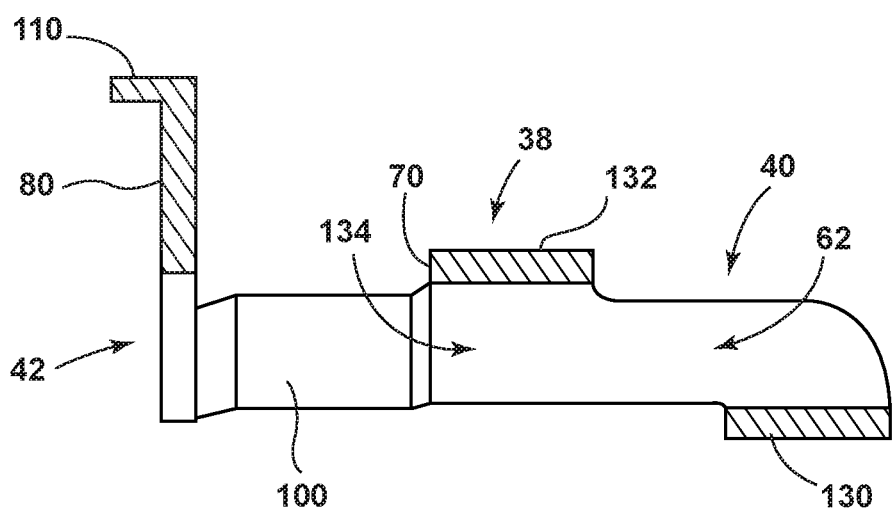
FIG. 5 is a cross-sectional view of the collet securing device of FIG. 4, taken along line V-V.
Figure 6:
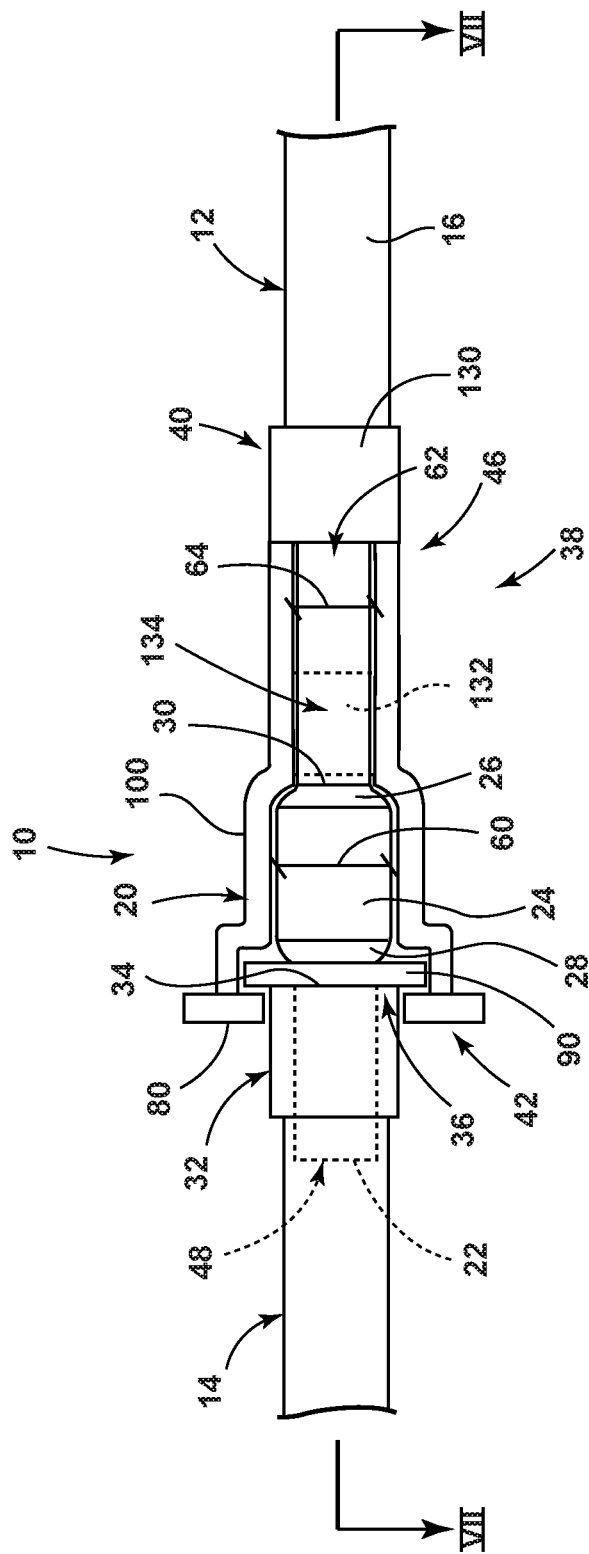
FIG. 6 is a bottom plan view of the collet securing device of FIG. 4, placed over a collet of a first fluid line and engaging a fluid valve of a second fluid line to secure the first fluid line to the second fluid line at a proper insertion depth.
Figure 7:
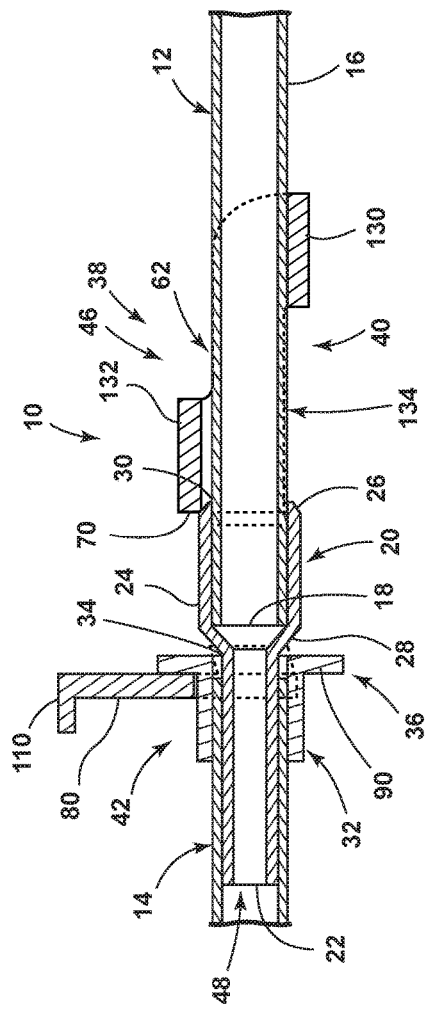
FIG. 7 is a cross-sectional view of the collet securing device of FIG. 6 taken along line VII-VII.
Figure 8:
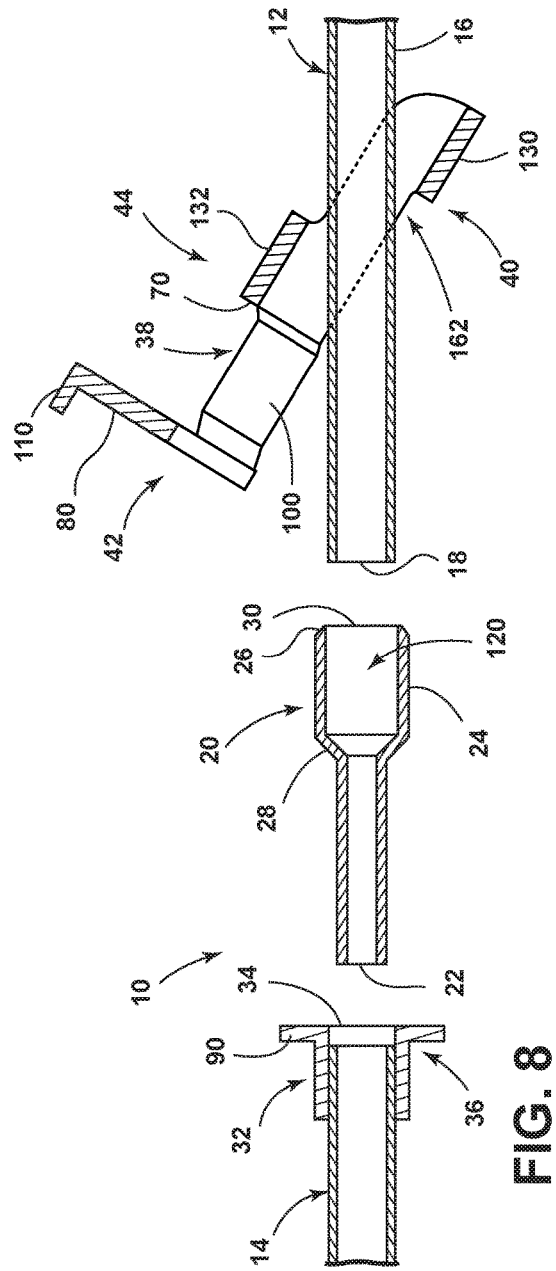
FIG. 8 is a partially exploded view of the collet securing device of FIG. 7.

As illustrated in FIGS. 1-8, reference numeral 10 generally refers to a fluid line support system for joining a fluid line 12 and a valve line 14 of an appliance (not shown). The fluid line support system 10 includes a fluid line 12 having a wall 16 and a line end 18. A collet 20 is included where the collet 20 has an insertion end 22 and a thickened portion 24. The thickened portion 24 includes a biased end 26 and a securing section 28, where the securing section 28 is disposed between the biased end 26 and the insertion end 22. The line end 18 of the fluid line 12 extends through a fluid line aperture 30 defined within the biased end 26 of the collet 20. A fluid valve 32 coupled with the valve line 14 includes a valve aperture 34 that receives the insertion end 22 of the collet 20. Engagement of the fluid valve 32 with the collet 20 places the valve line 14 in communication with the fluid line 12. The fluid line 12 includes a retaining portion 36. A collet securing device 38 has a fluid line portion 40 and a collet portion 42. The fluid line portion 40 engages the wall 16 of the fluid line 12, wherein at least the fluid line portion 40 encircles and/or surrounds at least a portion of the wall 16 of the fluid line 12 and is slidably engaged with the wall 16 to define a loose position 44 and a securing position 46 of the collet securing device 38. The collet portion 42 of the collet securing device 38 engages the retaining portion 36 of the fluid valve 32 when the collet securing device 38 is in the securing position 46. The securing position 46 is further defined by the fluid line portion 40 engaging the biased end 26 of the collet 20. In this manner, the fluid line and collet portions 40, 42 bias the retaining portion 36 and biased end 26 towards one another such that the insertion end 22 is positioned at a final insertion depth 48 within the fluid valve 32 to place the valve line 14 in communication with the fluid line 12.

Referring again to FIGS. 1-8, according to the various embodiments, the thickened portion 24 of the collet 20 has a cross-sectional thickness 60. It is contemplated that the thickened portion 24 can be round, square, or can include some other geometric shape. The fluid line portion 40 of the collet securing device 38 at least partially defines an opening 62 through the fluid line portion 40, wherein the fluid line 12 extends through the opening 62 defined within the fluid line portion 40. The opening 62 is sized to have an opening width 64. It is contemplated the opening width 64 is less than the cross-sectional thickness 60 of the thickened portion 24 of the collet 20. In this manner, once the collet securing device 38 is disposed on the fluid line 12 behind the collet 20, the collet securing device 38 is unable to be removed from the fluid line 12 and over the collet 20 without deforming, bending, cutting, or otherwise damaging the collet securing device 38, the collet 20 and/or the fluid line 12. Once the fluid line 12 is disposed through the opening 62 within the fluid line portion 40 of the collet securing device 38, the collet securing device 38 is slidably moveable over portions of the fluid line 12 to define the loose position 44 of the collet securing device 38.

In order to achieve the slidable engagement and substantial non-removability of the collet securing device 38 relative to the fluid line 12, the collet securing device 38 is placed on the fluid line 12 by threading the line end 18 of the fluid line 12 through the opening 62 within the fluid line portion 40 of the collet securing device 38. Once threaded therethrough, the collet 20 is secured to the line end 18 of the fluid line 12 to substantially retain the collet securing device 38 on the fluid line 12, although slidably movable thereon. It is contemplated that the collet 20 can be placed upon the line end 18 of the fluid line 12 by molding the collet 20 onto the line end 18 of the fluid line 12 through injection molding, compression molding or some other molding process. In various alternate embodiments, it is contemplated that the collet 20 can be pre-formed and secured to the line end 18 through adhesives, an interference connection, a mechanical attachment, or other similar attachment method.

Referring again to FIGS. 6-8, the collet securing device 38 can include an abutment portion 70 that engages at least a portion of the biased end 26 of the collet 20 when the collet securing device 38 is placed in the securing position 46. In this manner, when the collet securing device 38 is placed in the securing position 46, the engagement of the abutment portion 70 with the biased end 26 serves to bias the insertion end 22 of the collet 20 into the final insertion depth 48 as the collet portion 42 of the collet securing device 38 engages the fluid valve 32. The biased end 26 can be located proximate the thickened portion 24 or can be disposed at an end of the thickened portion 24. It is also contemplated the abutment portion 70, which can be included within the fluid line portion 40 of the collet securing device 38 or can be a separate physical feature of the collet securing device 38, can cooperate with the fluid line portion 40 to form the opening 62.

As exemplified in FIGS. 2-5, it is also contemplated that the abutment portion 70 and the fluid line portion 40 can cooperate to encircle or surround a portion of the fluid line 12 to form the sliding engagement between the collet securing device 38 and the fluid line 12 when the collet securing device 38 is in the loose position 44.

According to the various embodiments, it is contemplated that the collet securing device 38 can be formed from a single integral piece which can be made from plastic, composite, metal, polymers, combinations thereof, and other similar rigid materials. It is also contemplated the collet securing device 38 can be made from multiple components attached together to cooperatively define the collet securing device 38.

Referring again to FIGS. 6-8, when the collet securing device 38 is placed in the securing position 46, the engagement of the fluid line portion 40 with the wall 16 of the fluid line 12 can form a friction engagement wherein fluid line portion 40 is substantially secured to the fluid line 12 at a predetermined lateral position of the wall 16, relative to the collet 20. Typically, when the collet securing device 38 is placed in the secured position, the abutment portion 70 of the collet securing device 38 will be located proximate the biased end 26 of the collet 20 such that the abutment portion 70 can bias the biased end 26 toward the fluid valve 32. It is also contemplated that the friction-type engagement or interference-type engagement between the fluid line portion 40 of the collet securing device 38 and the wall 16 of a fluid line 12 can be achieved even when the collet portion 42 of the collet securing device 38 does not engage with the fluid valve 32. By way of example, and not limitation, during installation, it is contemplated that the collet securing device 38 can be placed in engagement with the fluid line 12 to allow the installer easy access to the collet securing device 38 during installation of the fluid line 12 with the valve line 14.

As exemplified in FIGS. 1-8, it is contemplated that the collet portion 42 of the collet securing device 38 can include a positioning flange 80 that is positioned at a predetermined distance from the insertion end 22 when the collet securing device 38 is in the securing position 46. In this manner, when the insertion end 22 is disposed into the fluid valve 32, the positioning flange 80 engages the retaining portion 36 of the fluid valve 32 and at least partially prevents insertion of the insertion end 22 beyond the final insertion depth 48 into the fluid valve 32. Accordingly, it is contemplated the positioning flange 80 of the collet portion 42 cooperates with the abutment portion 70 of the fluid line portion 40 of the collet securing device 38 to bias the fluid valve 32 and the collet 20 toward one another to set the final insertion depth 48 of the insertion end 22 of the collet 20 within the fluid valve 32. As such, during installation of the collet securing device 38, it is not necessary that the insertion end 22 be fully inserted into the fluid valve 32 at the final insertion depth 48. As the collet securing device 38 is moved from the loose position 44 into the securing position 46, the positioning flange 80 and the abutment portion 70 cooperate to bias the fluid valve 32 and the collet 20 toward one another to set the insertion end 22 of the collet 20 at the final insertion depth 48 within the fluid valve 32.

According to the various embodiments, when the collet securing device 38 is moved into the securing position 46, it is contemplated that the fluid line portion 40 of the collet securing device 38 can engage the fluid line 12 in a snapping engagement. Additionally, it is contemplated that the retaining portion 36 can include a groove or a valve flange 90 that receives a portion of the collet securing device 38. In such an embodiment, it is contemplated that the positioning flange 80 can cooperate with the valve flange 90 defined within the fluid valve 32 to set the position of the collet securing device 38 relative to the fluid valve 32.

Referring again to FIGS. 1-8, the collet securing device 38 can include an enlarged portion 100 that extends between the collet portion 42 and the abutment portion 70. In such an embodiment, the enlarged portion 100 can be configured to engaged the thickened portion 24 of the collet 20 when the collet securing device 38 is placed in the securing position 46. It is also contemplated that the engagement between the enlarged portion 100 can define a snapping-style engagement when the collet securing device 38 is moved into the securing position 46.

Referring again to FIGS. 1-5, 7 and 8, it is contemplated that the positioning flange 80 of the collet securing device 38 can include a grasping tab 110 that extends outward from positioning flange 80, typically at a right angle or substantially right angle, but could conceivably be at any angle, shape or distance from positioning flange 80. The grasping tab 110 can be configured to allow a user to bias the positioning flange 80 away from the fluid valve 32 and release the collet securing device 38 from securing engagement with the collet 20 and the fluid line 12 to remove the collet securing device 38 from the securing position 46 and back into the loose position 44. Disengagement of the collet securing device 38 may be desired during replacement of components of the appliance, repair of the appliance, or other similar occurrence where it may be desirable to remove the fluid line 12 from engagement with the valve line 14. Grasping tab 110 can also be located perpendicular to the enlarged portion 100 depending on orientation of the connection.

Referring again to FIGS. 4-8, the fluid line support system 10, which can be used to join a fluid line 12 and a valve line 14, can include the collet 20 having the insertion end 22 and the thickened portion 24, where the thickened portion 24 defines at least one securing section 28. The thickened portion 24 can define an internal volume 120 that is configured to be in communication with the insertion end 22 of the collet 20. The fluid valve 32 includes a valve aperture 34, wherein the insertion end 22 is inserted into the valve aperture 34 to define a final insertion depth 48 when the collet securing device 38 is in the securing position 46. It is contemplated the fluid valve 32 can include the retaining portion 36. The collet securing device 38 can include a collet portion 42 that engages the retaining portion 36 and a thickened portion 24 to define the securing position 46 of the collet securing device 38. The collet securing device 38 also includes first and second line engagement portions 130, 132 that cooperate with the internal volume 120 of the collet 20 to define a line receptacle 134 for positioning a fluid line 12 relative to the collet 20. The first and second line engagement portions 130, 132 are positioned opposite one another such that each of the first and second line engagement portions 130, 132 cooperate to form the opening 62 and encircle or surround at least a portion of the line receptacle 134 and the fluid line 12. It is also contemplated that one or both of the first and second line engagement portions 130, 132 extend around more than half of a portion of the wall 16 of the fluid line 12. By extending around a majority of the fluid line 12, one or both of the first and second line engagement portions 130, 132 define the snapping engagement defined above. In this manner, the first and/or second line engagement portions 130, 132, when moved into or out of the securing position 46, partially deflect outward to accomplish the snapping engagement.

According to the various embodiments, when the collet securing device 38 is placed in the securing position 46, the fluid line portion 40 of the collet securing device 38 surrounds at least a portion of the fluid line 12 as the fluid line 12 enters into the internal volume 120 of the collet 20. In this manner, the fluid line portion 40 of the collet securing device 38, which can include the first and second line engagement portions 130, 132, serves to provide lateral support for the fluid line 12 as it engages the collet 20. This lateral support can substantially prevent bending, deflection, and other unwanted movement of the fluid line 12 as it enters into the collet 20 that may result in fluid leaks. Such unwanted deflection can result in partial or total impediment of fluid running through the fluid system of an appliance or, at least, through the fluid line 12 and the valve line 14. This deflection can also result in fluid leaks within or proximate to the fluid line 12. The collet 20 serves to prevent this deflection and also minimize the occurrence of fluid leaks in the fluid line 12. Therefore, the positioning of the collet securing device 38 in the securing position 46 causes the fluid line portion 40 of the collet securing device 38 to extend from the fluid line 12, over the collet 20, and beyond the collet 20 to engage portions of the fluid line 12 and provide the lateral support described above.

According to the various embodiments, it is contemplated that at least one of the first and second line engagement portions 130, 132 can also define the abutment portion 70 of the collet securing device 38. Engagement portion 130 is typically upwardly open toward the fluid line 12 and engagement portion 132 is typically downwardly open toward the fluid line 12. Both engagement portions 130, 132 typically have a substantially U-shaped lateral cross section.

Figure 9:
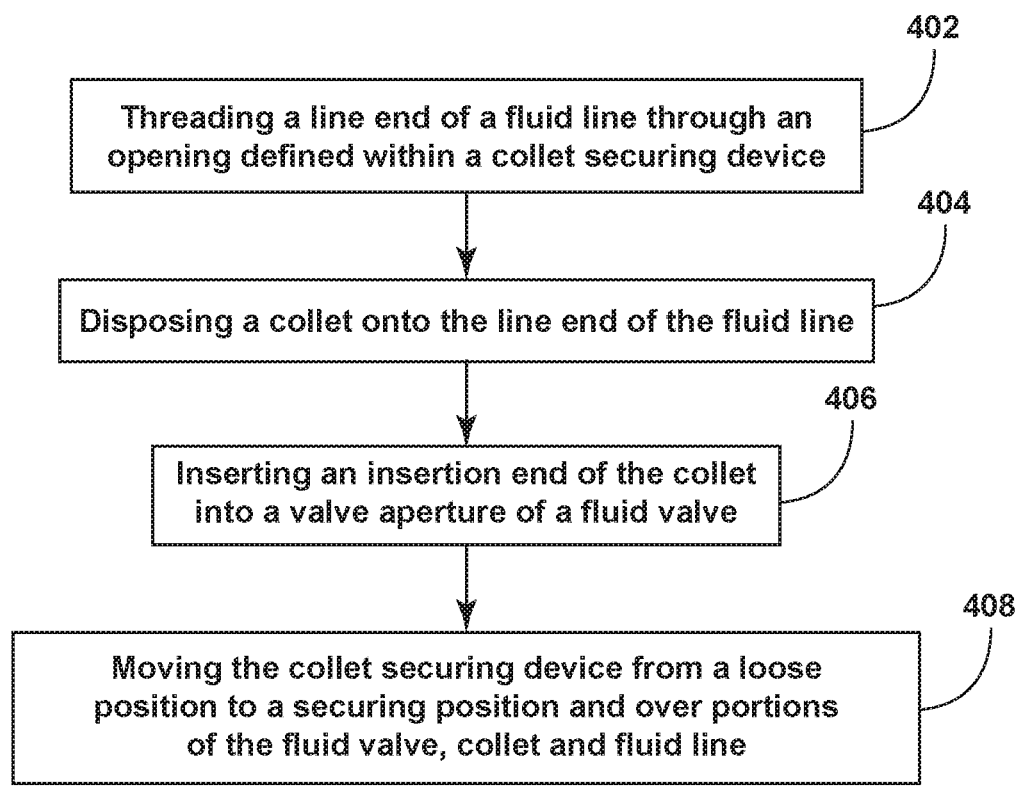
FIG. 9 is a schematic flow diagram illustrating a method for attaching a fluid line support system to a fluid line of an appliance using a collet securing device.

Referring now to FIGS. 4-9, having described the fluid line support system 10 and the engagement of the collet securing device 38 with the collet 20, the fluid line 12 and the fluid valve 32, a method 400 is disclosed for attaching the fluid line support system 10 to a fluid line 12 of an appliance using the fluid line support system 10 described above. According to the method 400, one of the steps can include threading the line end 18 of the fluid line 12 through the opening 62 defined within the collet securing device 38 (step 402). As discussed above, the line end 18 of the fluid line 12 is disposed through the opening 62 before disposing the collet 20 on the line end 18 of the fluid line 12. Once threaded or otherwise inserted or passed through the opening 62, the method 400 can also include step 404 of disposing the collet 20 onto the line end 18 of the fluid line 12, wherein the thickened portion 24 of the collet 20 has a cross-sectional thickness 60 and the opening 62 of the collet securing device 38 includes an opening width 64 that is less than a cross-sectional thickness 60 of the thickened portion 24. As discussed above, once the collet 20 is placed on the line end 18 of the fluid line 12, the collet securing device 38 is substantially secured, in a sliding engagement, with the fluid line 12. Again, it is contemplated that the collet 20 can be molded onto the fluid line 12, or can be pre-formed and disposed thereon through a mechanical or adhesive-type attachment.

Referring again to FIG. 9, once the collet 20 is disposed on the line end 18 and the collet securing device 38 is confined in a sliding engagement with the fluid line 12, the insertion end 22 of the collet 20 can be inserted into the valve aperture 34 such that the insertion end 22 is positioned at least near the final insertion depth 48 (step 406). Once placed near the final insertion depth 48, the collet securing device 38 is moved from the loose position 44 and is disposed in the securing position 46 (step 408). As discussed above, when in the securing position 46, the fluid line portion 40 of the collet securing device 38 engages and encircles a portion of the fluid line 12. Additionally, the collet portion 42 engages the retaining portion 36 of the fluid valve 32 to secure the insertion end 22 at the final insertion depth 48 within the fluid valve 32. As discussed above, the collet portion 42 and the fluid line portion 40 of the collet securing device 38 cooperate to bias the insertion end 22 into the fluid valve 32 to set the final insertion depth 48 of the insertion end 22. Additionally, the engagement of the collet securing device 38 in the securing position 46 services to limit the deflection of the fluid line 12 proximate the collet 20 and the fluid valve 32. Again, the first and second line engagement portions 130, 132 serve to surround or encircle at least a portion of the fluid valve 32 approximate the collet 20 such that the first and second line engagement portions 130, 132 substantially prevent deflection, bending, or other movement of the fluid line 12 that might impede the flow of fluid through the fluid line 12 or valve line 14.

According to the various embodiments, the step 408 of disposing the collet securing device 38 in the securing position 46 can include an additional step of sliding the collet securing device 38 along a portion of the fluid line 12 and toward the collet 20, and then disposing the collet securing device 38 over the thickened portion 24 of the collet 20 to define a snap engagement between the collet portion 42 and the thickened portion 24. It is contemplated that a snapping engagement can also be defined between the fluid line portion 40 and the fluid line 12, as substantially described above.

In the various embodiments, the term "valve" as used herein is not limited to any single configuration of a conventional valve. The term valve is contemplated to include any line, fixture, member or apparatus through which fluid can be conducted and can include, but is not limited to, a valve, filter, spigot, fluid line, collet, union, joint or other similar connection or fitting between multiple elements through which fluid selectively flows.

What is claimed is:

1. A fluid line support system comprising:
a fluid line having a line end;
a collet having an insertion end and a biased end, and wherein the line end of the fluid line extends through the biased end;
a fluid fitting for a fitting line, the fluid fitting receiving the insertion end of the collet, wherein engagement of the fluid fitting with the collet places the fitting line in communication with the fluid line; and
a collet securing device having a fluid line portion and a collet portion, wherein the fluid line portion encircles the fluid line to define a loose position and a securing position, wherein the collet portion engages the fluid fitting when the collet securing device is in the securing position, wherein the collet portion includes a positioning flange, wherein when the insertion end is disposed into the fluid fitting, the positioning flange engages the fluid fitting and at least partially prevents insertion of the insertion end beyond a final insertion depth into the fluid fitting, and wherein the positioning flange includes a grasping tab that extends outward from the positioning flange and is configured to release the collet securing device from securing engagement with the collet and the fluid line.

2. The fluid line support system of claim 1, wherein the securing position is further defined by the fluid line portion engaging the biased end of the collet and wherein the fluid line and collet portions bias the fluid fitting and biased end toward one another such that the insertion end is positioned at the final insertion depth.

3. The fluid line support system of claim 1, wherein the collet includes a thickened portion having a cross-sectional thickness and the fluid line portion at least partially defines an aperture that encircles the fluid line, wherein the aperture defines a width, and wherein the width is less than the cross-sectional thickness.

4. The fluid line support system of claim 1, wherein the engagement of the fluid line portion with the fluid line when the collet securing device is in the securing position forms a surface-to-surface engagement wherein the fluid line portion is substantially secured to the fluid line at a predetermined lateral position of the fluid line.

5. The fluid line support system of claim 1, wherein the collet securing device includes an abutment portion that engages at least a portion of the biased end.

6. The fluid line support system of claim 5, wherein the abutment portion and the fluid line portion cooperate to form an aperture.

7. The fluid line support system of claim 2, wherein the positioning flange is positioned at a predetermined distance from the insertion end when the collet securing device is in the securing position.

8. The fluid line support system of claim 3, wherein an enlarged portion of the collet securing device extends between the collet portion and an abutment portion of the collet securing device, wherein the enlarged portion engages the thickened portion of the collet.

9. The fluid line support system of claim 7, wherein as the collet securing device is moved into the securing position, the fluid line portion engages the fluid line in a snapping engagement and a retaining portion of the fluid line includes a groove that receives a portion of the collet portion of the collet securing device.

10. A fluid line support comprising:
a collet having an insertion end and at least one securing section;
a fluid coupler having a coupler aperture wherein the insertion end is inserted into the coupler aperture to define a final insertion depth; and
a collet securing device having a collet portion that engages the fluid coupler and the at least one securing section to define a securing position, wherein the collet securing device cooperates with the collet to define a line receptacle for positioning a fluid line, and wherein the collet securing device encircles the line receptacle, wherein the collet securing device includes a positioning flange and the insertion end is configured to be disposed into the fluid coupler such that engagement between the positioning flange and the fluid coupler at least partially prevents insertion of the insertion end beyond the final insertion depth into the fluid coupler, and wherein the positioning flange includes a grasping tab that extends outward from the positioning flange and is configured to release the collet securing device from securing engagement with the collet and the fluid line.

11. The fluid line support of claim 10, wherein the positioning flange is positioned at a predetermined distance from the insertion end when the collet securing device is in the securing position, and wherein the securing position is further defined by the positioning flange engaging the fluid coupler.

12. The fluid line support of claim 10, wherein the collet includes a thickened portion having a biased end disposed at an end of the thickened portion, and wherein the collet securing device includes an abutment portion that engages the biased end when the collet securing device is in the securing position.

13. The fluid line support of claim 12, wherein the collet securing device includes opposing first and second line engagement portions, and wherein the abutment portion is defined within one of the first and second line engagement portions.

14. The fluid line support of claim 12, wherein the collet securing device includes an enlarged portion that engages the thickened portion of the collet when the collet securing device is in the securing position, wherein engagement of the abutment portion and the enlarged portion with the collet defines a snapping engagement that substantially secures the collet and the collet securing device and further operates to define the line receptacle.

15. The fluid line support of claim 14, wherein the enlarged portion of the collet securing device extends between the collet portion and the abutment portion, wherein the enlarged portion engages the thickened portion of the collet.

16. A method for selectively engaging a fluid system of an appliance, the method comprising steps of:
passing a fluid line through an opening of a collet securing device;
disposing a collet onto the fluid line, wherein a portion of the collet has a cross-sectional thickness that is greater than an opening width of the opening;
inserting an insertion end of the collet into a fitting aperture;
disposing the collet securing device in a securing position, wherein a fluid line portion of the collet securing device engages and encircles a portion of the fluid line and a collet portion of the collet securing device engages a fluid fitting of a fitting line to secure the insertion end at a final insertion depth within the fluid fitting, wherein engagement of the collet securing device in the securing position limits deflection of the fluid line proximate the collet and the fluid fitting, and wherein a positioning flange of the collet portion prevents insertion of the insertion end beyond the final insertion depth; and
releasing the collet securing device from the securing position by operating a grasping tab that extends outward from the positioning flange.

17. The method of claim 16, wherein the step of disposing the collet securing device in the securing position includes sliding the collet securing device along a portion of the fluid line and toward the collet and disposing the collet securing device over a thickened portion of the collet to define a snapping engagement between the collet portion and the thickened portion and between the fluid line portion and the fluid line.

18. The method of claim 16, wherein the collet is injection molded, onto a line end of the fluid line.

* * * * *

UNITED STATES PATENT AND TRADEMARK OFFICE
CERTIFICATE OF CORRECTION

PATENT NO. : 10,234,065 B2  
APPLICATION NO. : 15/488922  
DATED : March 19, 2019  
INVENTOR(S) : Tamboli et al.

Page 1 of 1

It is certified that error appears in the above-identified patent and that said Letters Patent is hereby corrected as shown below:

On the Title Page

Item (72) Inventor is corrected to read:  
-- Manjur Tamboli, St. Joseph, MI (US);  
Melissa Marie Bippus, Evansville, IN (US);  
Don Currey, Chagrin Falls, OH (US);  
Scott Gardner, Chagrin Falls, OH (US). --

Signed and Sealed this  
Thirty-first Day of December, 2019

Andrei Iancu  
*Director of the United States Patent and Trademark Office*